United States Patent
Ahmed (10) Patent No.: US 11,892,940 B2
(45) Date of Patent: Feb. 6, 2024

(54) NETWORK INTEGRATED DIAGNOSTIC SYSTEM AND PREDICTIVE ANALYSIS TOOL FOR MITIGATING SERVICE IMPACTS ON APPLICATION SERVICES

(71) Applicant: BANK OF AMERICA CORPORATION, Charlotte, NC (US)

(72) Inventor: Fauzia Ahmed, Irving, TX (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 17/668,113

(22) Filed: Feb. 9, 2022

(65) Prior Publication Data
US 2023/0251954 A1    Aug. 10, 2023

(51) Int. Cl.
G06F 11/36    (2006.01)

(52) U.S. Cl.
CPC .................. *G06F 11/366* (2013.01)

(58) Field of Classification Search
CPC .............................. G06F 11/36–366
See application file for complete search history.

(56) References Cited

U.S. PATENT DOCUMENTS

| | | |
|---|---|---|
| 6,353,445 B1 | 3/2002 | Babula et al. |
| 6,377,162 B1 | 4/2002 | Delestienne et al. |
| 6,381,557 B1 | 4/2002 | Babula et al. |
| 6,578,002 B1 | 6/2003 | Derzay et al. |
| 6,598,011 B1 | 7/2003 | Koritzinsky et al. |
| 6,609,051 B2 | 8/2003 | Fiechter et al. |
| 6,901,371 B1 | 5/2005 | Koritzinsky et al. |
| 7,081,823 B2 | 7/2006 | Gluhovsky et al. |
| 7,209,817 B2 | 4/2007 | Abdel-Malek et al. |
| 7,313,447 B2 | 12/2007 | Hsiung et al. |
| 7,681,182 B1 * | 3/2010 | Mistry .................. G06F 11/366 714/48 |
| 7,881,920 B2 | 2/2011 | Abu El Ata et al. |

(Continued)

OTHER PUBLICATIONS

Eskenazi et al., "Analysis and Prediction of Performance for Evolving Architectures", proceedings of the 30th EUROMICRO Conference (EUROMICRO'04), published by IEEE, pp. 1-10 (Year: 2004).*

*Primary Examiner* — S. Sough
*Assistant Examiner* — Zheng Wei (57) ABSTRACT

A diagnostic system for determining and predicting service impacts to network connected applications. The diagnostic system stores static variables for each application in the network and receives real-time data for applications in the network. Each static variable comprises a processing time frame that is predetermined and considered an acceptable time for executing an application and a time threshold that is predetermined and considered an acceptable time for executing another application functionally dependent thereon. The real-time data comprise a time delay value for each application and is a measured time for executing an application. The system compares a time delay with a processing time frame for an application. The comparison result is used to determine a service impact for the application. The system predicts a probability of another service impact for a functionally dependent application using an algorithmic model, the service impact, and a time threshold for the dependent application.

17 Claims, 2 Drawing Sheets

(56) References Cited

U.S. PATENT DOCUMENTS

| | | |
|---|---|---|
| 8,200,527 B1 | 6/2012 | Thompson et al. |
| 8,209,218 B1 | 6/2012 | Basu et al. |
| 8,219,983 B1* | 7/2012 | Sobel .................. G06F 8/60 |
| | | 717/126 |
| 8,364,519 B1 | 1/2013 | Basu et al. |
| 8,386,465 B2 | 2/2013 | Ansari et al. |
| 8,903,593 B1 | 12/2014 | Addepalli et al. |
| 8,924,033 B2 | 12/2014 | Goutard et al. |
| 9,405,914 B2 | 8/2016 | Amorim |
| 9,606,520 B2 | 3/2017 | Noboa et al. |
| 9,639,413 B2 | 5/2017 | Drees et al. |
| 10,311,015 B2 | 6/2019 | Nixon et al. |
| 10,560,468 B2 | 2/2020 | Muddu et al. |
| 10,901,373 B2 | 1/2021 | Locke et al. |
| 11,030,551 B2 | 6/2021 | Abu El Ata |
| 11,120,904 B2 | 9/2021 | Nuthi et al. |
| 2002/0004798 A1 | 1/2002 | Babula et al. |
| 2003/0172002 A1 | 9/2003 | Spira et al. |
| 2004/0078691 A1* | 4/2004 | Cirne .................. G06F 11/3636 |
| | | 714/E11.207 |
| 2004/0128585 A1* | 7/2004 | Hind .................. G06F 11/366 |
| | | 714/E11.21 |
| 2005/0261941 A1 | 11/2005 | Scarlat |
| 2006/0195564 A1 | 8/2006 | Accardi et al. |
| 2007/0250739 A1* | 10/2007 | Avritzer .............. G06F 11/1438 |
| | | 714/38.1 |
| 2008/0221834 A1 | 9/2008 | Damodharan |
| 2009/0112668 A1 | 4/2009 | Abu El Ata |
| 2009/0119142 A1 | 5/2009 | Yenni et al. |
| 2011/0020785 A1 | 1/2011 | Lowery, Jr. et al. |
| 2011/0208567 A9 | 8/2011 | Roddy et al. |
| 2011/0225001 A1 | 9/2011 | Shen |
| 2012/0221251 A1 | 8/2012 | Rosenberg et al. |
| 2013/0046809 A1* | 2/2013 | Jiang .................. H04L 43/0852 |
| | | 709/224 |
| 2013/0325505 A1 | 12/2013 | Vengco |
| 2014/0025390 A1 | 1/2014 | Shen |
| 2014/0222444 A1 | 8/2014 | Cerello et al. |
| 2014/0336984 A1 | 11/2014 | Starr |
| 2014/0343955 A1 | 11/2014 | Raman |
| 2015/0170439 A1 | 6/2015 | Chen et al. |
| 2015/0339263 A1 | 11/2015 | Abu El Ata et al. |
| 2016/0078695 A1 | 3/2016 | McClintic et al. |
| 2017/0169392 A1 | 6/2017 | Agrawal et al. |
| 2018/0032904 A1* | 2/2018 | Xu .................. G06F 11/366 |
| 2018/0300227 A1* | 10/2018 | Bergen .................. G06F 11/079 |
| 2019/0235485 A1 | 8/2019 | Piety et al. |
| 2019/0295725 A1 | 9/2019 | Morrow, Jr. |
| 2020/0067789 A1 | 2/2020 | Khuti et al. |
| 2020/0376979 A1 | 12/2020 | Liang et al. |
| 2021/0349713 A1* | 11/2021 | Khawaja .................. G06F 11/302 |

* cited by examiner

NETWORK INTEGRATED DIAGNOSTIC SYSTEM AND PREDICTIVE ANALYSIS TOOL FOR MITIGATING SERVICE IMPACTS ON APPLICATION SERVICES

TECHNICAL FIELD

The present disclosure relates generally to computer networks and application services, and more specifically to a network integrated diagnostic system and predictive analysis tool for mitigating service impacts on application services.

BACKGROUND

Application services can be used in many industries to perform various tasks. These tasks can relate to something as simple as triggering an email item in response to a change in folder status, controlling operation of an automobile in response to a multitude of sensor readings, and performing a batch transactional operation on time sensitive data. In some instances, such as triggering an email item in response to a change in folder status, time may not be critical but in the latter two instances timing as it relates to processing and communication of application workflow data can be critical. Disruptions in the processing and communication of application workflow data can impact an application service being rendered and, therefore, result in the loss and/or misuse of network bandwidth and processing resources.

Depending on the application service, a service rendered can be dependent on hundreds of supportive application and networking services. In some cases, some of the supportive applications and networking services may not be under a single service provider's control. As an example, application and networking services required to perform batch transactional operations on time sensitive workflow data may be structured in such a way that an originating entity may perform certain application and networking functions associated with an application service and one or more vendors may perform other application and networking functions associated with the application service. Maintenance delays are inherent in any type of application service that experiences a service disruption. These maintenance delays can be magnified when the service being rendered requires the assistance of hundreds of applications in rendering the service and is a multiparty service, or both. Regardless of how a network is structured or the number of applications used to render a particular service, efficient processing and communication of application workflow data are important to maintain a satisfactory level of service and satisfy any established service level requirements.

SUMMARY

The present disclosure describes a network integrated diagnostic system and predictive analysis tool used to identify disruptions in application workflow data of an application service, determine and predict an impact to one or more applications, and render an analysis report to responsible parties. The network integrated diagnostic system and predictive analysis tool are integrated with multiple system processors, multiple communication protocol stacks, and a plurality of application services and used to detect disruptions in application workflow data. The network integrated diagnostic system and predictive analysis tool improves state of the art application services and network technology by detecting inefficiencies in the processing and communication of real-time application data associated with an application service or services.

In an example use case, a primary entity and one or more secondary entities are responsible for rendering a time-sensitive application service comprising a set of applications (application workflow) that function together to perform a specific task. The application service comprises hundreds of applications that provide application and network functions for enabling the application service. The primary entity and the one or more secondary entities are bound by one or more service level agreements.

In a practical application of the network integrated diagnostic system and predictive analysis tool, the network integrated diagnostic system and predictive analysis tool monitors real-time workflow data generated by the applications, detects disruptions of real-time workflow data, e.g. based on a data rate or an aggregated data rate, and determines an impact to an application function and potential impacts to dependent application functions. The network integrated diagnostic system and predictive analysis tool then determines if the disruptions are significant enough to breach the one or more service level agreements and, therefore, have a negative impact on the application service. A report is generated identifying the application service, the impacted application functions, their dependencies, and the effects, or potential thereof, the impacted functions have on the one or more service level agreements. The report is then used to remedy the issue in a timely manner so that network and processing resources are used in a more efficient and timely manner. For example, the processing and memory resources being reserved for idle applications may be redirected to perform other tasks. In addition, other sources of real-time workflow data may be identified and used to replace the disrupted real-time workflow data so as to avoid wasting networking, processing, and memory resources.

The network integrated diagnostic system and predictive analysis tool provides an improvement over existing networking technology in that it can detect disruptions in real-time workflow data in an application workflow and the potential for disruptions to real-time workflow data in the application workflow and whether the disruptions are significant enough to have a negative impact on the quality of an application service based on a predetermined level of quality of service. Based on this information, the operation of application services in the workflow that are affected by the potential disruptions can be modified to avoid the misuse and waste of networking and processing resources.

To that end, presented herein is a system that comprises a memory and a processor configured by instructions to identify disruptions in application workflow data of an application service, determine and predict an impact to one or more applications, and render an analysis report. The memory is configured to store static variables for a plurality of applications. The static variables comprise a processing time frame to satisfy a service level requirement for a first application and a time threshold to satisfy a service level requirement for a second application. The processor is also configured to: receive real-time data for a first application, wherein the first application is associated with the second application in a workflow, the real-time data for the first application comprises a time delay associated with executing the first application; compare the real-time data for the first application with the static variables for the first application; determine a first service impact for the first application based on the comparison of the real-time data for the first application with the static variables for the first application; predict a second service impact for the second application based on the first service impact for the first application and the time threshold associated with the second application; generate a service impact report according to the determined first service impact and the predicted second service impact; and send the service impact report to at least one recipient computing device.

In some embodiments, the processor is further configured to: receive real-time data for the second application, wherein the second application is associated with a third application in the workflow; wherein the static variables further comprise a second processing time frame required to satisfy a service level requirement for the second application and a second time threshold required to satisfy a service level requirement for the third application; compare the real-time data of the second application with the static variables of the second application; determine a third service impact for the second application based on the comparison of the real-time data for the second application with the static variables for the second application; predict a fourth service impact for the third application based on the third service impact for the second application and the second time threshold associated with the third application; generate a second service impact report according to the determined third service impact and the predicted fourth service impact; and send the second service impact report to the at least one recipient computing device.

In other embodiments, the applications are network connected and configured to perform a time sensitive network service using at least one hand-shake signal between the first application and at least one other application from the plurality of applications. In some of these embodiments, the processor is further configured to determine the time delay associated with executing the first application based at least in part upon the at least one hand-shake signal. In still yet other embodiments, the processor is further configured to compare the time delay associated with executing the first application against a threshold value associated with the first application to determine the first service impact. In yet other embodiments, the processor is further configured to predict the service impact using a knowledge base and an algorithmic model. Yet in other embodiments, the processor is further configured to determine an effect of the service impact based the static variables.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
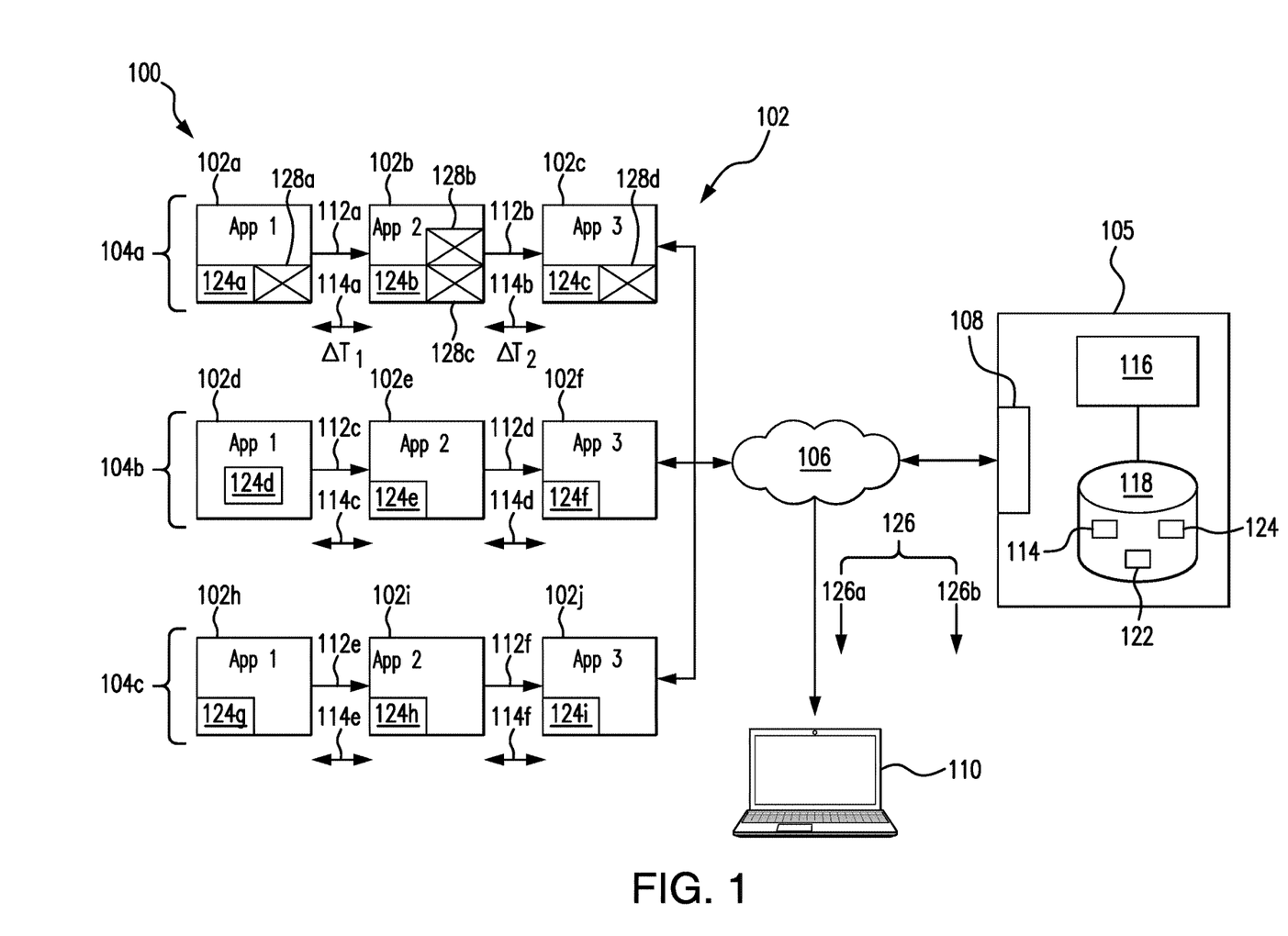
FIG. 1 illustrates an embodiment of a network integrated diagnostic system and predictive analysis tool.
Figure 2:
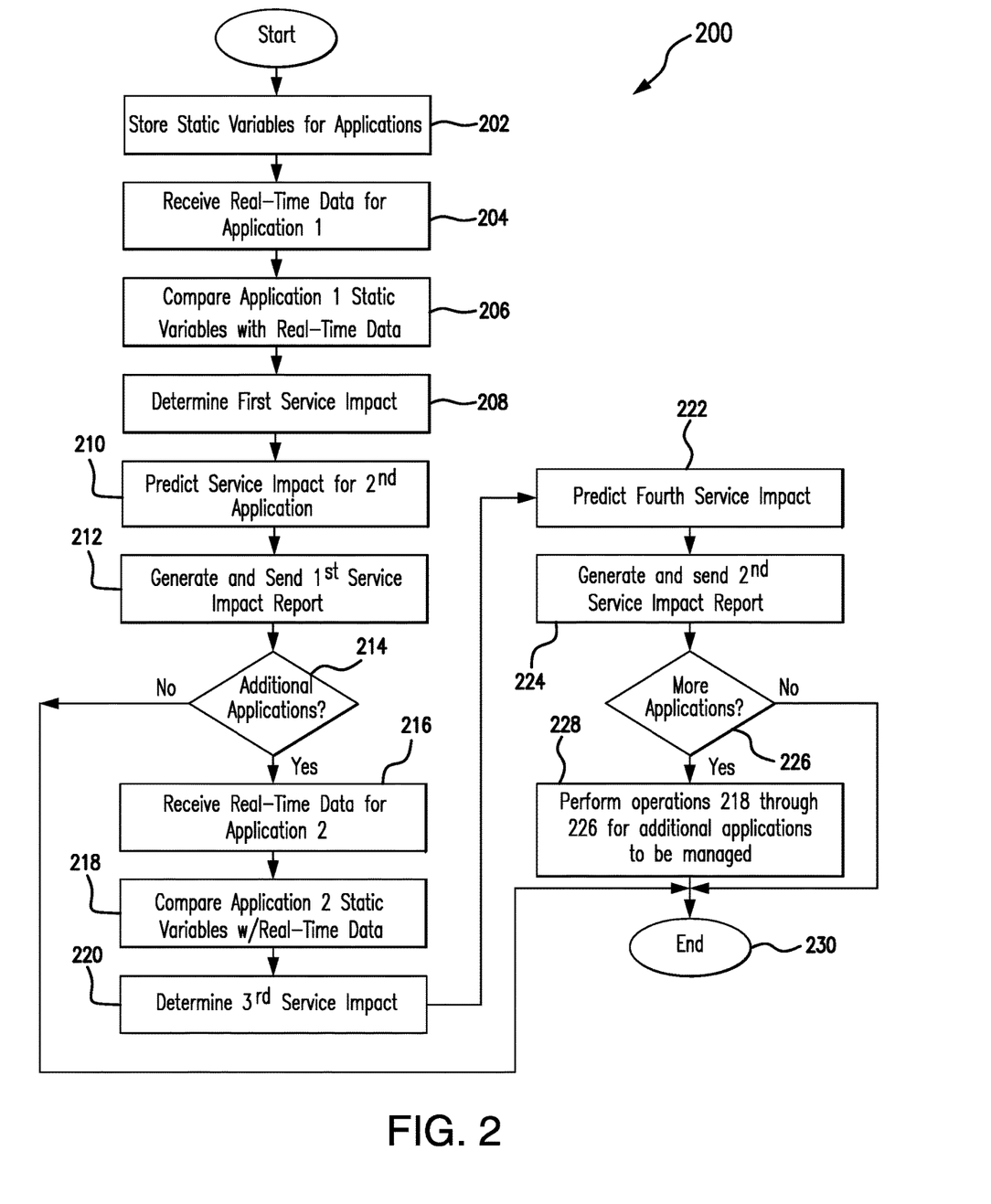
FIG. 2 illustrates an example operational flow of the network integrated diagnostic system and predictive analysis tool of FIG. 1.

As described above, previous technologies fail to identify disruptions in application workflow data of an application service, determine and predict an impact to one or more applications, and render an analysis report. This disclosure addresses those limitations. FIG. 1 illustrates an example embodiment of an application service architecture 100 that detects disruptions in workflow data of an application workflow, determines and predicts a service impact to one or more applications of the application workflow, and renders an analysis report. FIG. 2 is a flow diagram depicting the operational flow 200 of the application service architecture 100 of FIG. 1, according to certain example embodiments.

Example System for Implementing the Network Integrated Diagnostic System and Predictive Analysis Tool The application service architecture 100 comprises a plurality of network connected applications 102 and a network integrated diagnostic system and predictive analysis tool 105 communicatively coupled to the plurality of applications 102 through a network 106 and a network interface 108. The network integrated diagnostic system and predictive analysis tool 105 can also be communicatively coupled to one or more user computing devices 110. The network connected applications 102 are grouped into application workflows 104a-104c. Each application workflow 104a-104c is configured to render an application service. Workflow 104a comprises applications 102a-102c, workflow 104b comprises applications 102d-f, and workflow 104c comprises applications 102g-i. Each of the applications 102a-102c, applications 102d-102f, and applications 102g-102i are configured to perform one or more functions in support of rendering an application service. The application workflows 104a-104c generate workflow data 112a-112b, 112c-112d, and 112e-112f and real-time data 114a-114b, 114c-114d, and 114e-114f. Application 102b is functionally dependent on application 102a and application 102c is functionally dependent on application 102b. A similar dependency applied to applications 102a-102c also applies to applications 102d-102i. Moreover, workflow data 112b is dependent on workflow data 112a, workflow data 112d is dependent on workflow data 112c, and workflow data 112f is dependent on workflow data 112e. Although FIG. 1 illustrates only three application workflows 104 with each application workflow 104 having only three applications 102, it should be understood that in practice there can be any suitable number and combination of application workflows 104 and associated applications 102. The tool 105 comprises a processor 116 and a memory 118 communicatively coupled to processor 116. Memory 118 stores an instruction set 122, application static variables 124, and real-time data 114a-114b, 114c-114d, and 114e-114f. Each of the applications 102a-102i have static variables 124a-124i associated therewith. Memory 118 may be implemented using any suitable storage system, such as a database, and may store any suitable information and data used in the operation of architecture 100.

In general, tool 105 is configured to identify disruptions in workflow data of an application workflow 104a, 104b, or 104c, determine and predict a service impact to one or more of the applications 102 within the application workflows 104a-104c, and render a service impact report 126. In certain embodiments, the service impact report 126 may then be used to remedy the issue in a timely manner so that network, processing, and memory resources can be used in a more efficient and timely manner. For example, the processing and memory resources being reserved for idle applications 102 may be redirected to perform other tasks. In addition, other sources of workflow data 112 may be identified and used to replace the disrupted workflow data 112 to avoid wasting processing and memory resources. As previously stated, an application service is a system function that is generated by applications 102a-c, 102d-f, or 102g-i of the application workflows 104a-104c working together in a coordinated manner. A service impact is a delay in processing application workflow data 112a-112b, 112c-112d, or 112e-112f in application workflows 104a-104c that is significant enough to default on one or more service level agreements.

System Components

Network

Network 106 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

Network Integrated Diagnostic System and Predictive Analysis Tool

The network integrated diagnostic system and predictive analysis tool 105 is a device that is configured to process data and communicate with the plurality of applications 102 via the network 106. Tool 105 is generally configured to identify disruptions in workflow data of an application workflow function to render an application service, determine and predict an impact to one or more applications, and render an analysis report to responsible parties. This operation of the network integrated diagnostic system and predictive analysis tool 105 is described further below in conjunction with the operational flow 200 of FIG. 2.

The network integrated diagnostic system and predictive analysis tool 105 comprises processor 116 in signal communication with network interface 108 and memory 118. Memory 118 stores a software instruction set 122 that when executed by the processor 116, cause the network integrated diagnostic system and predictive analysis tool 105 to perform one or more functions described herein. For example, when the software instruction set 122 is executed, tool 105 identifies disruptions in workflow data 112a-112f of an application workflow 104a, 104b, or 104c to render an application service, determines and predicts an impact to one or more of the plurality of applications 102, and renders an impact service report 126 to the user computing device 110, system tools used in the maintenance of application functions, or both. In certain embodiments, the service impact report 126 may then be used to remedy the issue in a timely manner so that network, processing, and memory resources can be used in a more efficient and timely manner. For example, the processing and memory resources being reserved for idle applications 102 may be redirected to perform other tasks. In addition, other sources of workflow data 112 may be identified and used to replace the disrupted workflow data 112 to avoid wasting processing and memory resources. The network integrated diagnostic system and predictive analysis tool 105 may be configured as shown, or in any other configuration.

Processor 116 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 116 may be a programmable logic device, a microcontroller, a microprocessor, or any suitable combination of the preceding. The processor 116 is communicatively coupled to and in signal communication with the network interface 108 and memory 118. The processor 116 is configured to process data and may be implemented in hardware or software. For example, processor 116 may be 8-bit, 16-bit, 32-bit, 64-bit, or of any other suitable architecture. The processor 116 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 116 is configured to implement various instructions. For example, the processor 116 is configured to execute the software instruction set 122 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Network interface 108 is configured to enable wired and/or wireless communications (e.g., via the network 106). The network interface 108 is configured to communicate data between the network integrated diagnostic system and predictive analysis tool 105 and other network devices, systems, or domain(s). For example, the network interface 108 may comprise a WIFI interface, a local area network (LAN) interface, a wide area network (WAN) interface, a modem, a switch, or a router. The processor 116 is configured to send and receive data using the network interface 108. The network interface 108 may be configured to use any suitable type of communication protocol.

Memory 118 may be volatile or non-volatile and may comprise a read-only memory (ROM), random-access memory (RAM), ternary content-addressable memory (TCAM), dynamic random-access memory (DRAM), and static random-access memory (SRAM). Memory 118 may be implemented using one or more disks, tape drives, solid-state drives, and/or the like. Memory 118 is operable to store the software instruction set 122, static variables 124, real-time data 114a-114f, and/or any other data or instructions. The software instruction set 122 may comprise any suitable set of instructions, logic, rules, or code operable to execute the processor 116.

The operation of the disclosed architecture 100 is described in conjunction with the operational flow 200 described in FIG. 2.

Operational Flow

In operation, the network integrated diagnostic system and predictive analysis tool 105 determine delays in processing and communicating workflow data 112a-112f, determines and predicts if the delays will cause a service impact to one or more applications 102a-102i of the application workflows 104a-104c, and renders a service impact report 126 if a positive determination is realized. The service impact report 126 is used by automated service maintenance tools or by other means to remedy the cause of the delays.

The plurality of network connected applications 102 can comprise one or more applications belonging to a primary entity responsible for rendering application functions in support of application services and/or one or more applications belonging to third-party vendors responsible for rendering application functions in support of application services. Network 106 can comprise the Internet and multiple intranets and can comprise network computing devices associated with a primary entity responsible for rendering select application functions for application services and one or more third party vendors responsible for rendering select application functions for application services. In certain embodiments, these types of third-party arrangements may introduce delays in service maintenance when a service impact is realized. The network 106 is an abstract representation of networked computing devices. The networked computing devices themselves are not illustrated in FIG. 1 but would be readily understood as component parts thereof by anyone skilled in the art.

As previously stated, each application 102a-102i in the application workflows 104a-104c is configured to perform a particular application function based on an application service that is being rendered. Disruptions or interrupts in the execution of the applications 102a-102i can result in delays in the processing and communication of the workflow data 112a-112f. In an embodiment, the tool 105 can detect the disruptions or interrupts by monitoring the real-time data 114a-114b, 114c-114d, and 114e-114f and either derive measurements therefrom or use measurements that have been derived therefrom.

The real-time data 114a-114b, 114c-114d, and 114e-114f are data either generated by a function of an application 102a-102i of the application workflows 104a-104c or a network application service of the networked computing devices from network 106. The real-time data 114a-114b, 114c-114d, 114e-114f are used to determine if delays are present in the processing and communications of workflow data 112a-112b, 112c-112d, 112e-112f. As an example type of real-time data 114a-114b, 114c-114d, 114e-114f that can be used to determine delays, the applications 102a-102i, or networked computing devices associated therewith, of the application workflows 104a-104c generate real-time data 114a-114b, 114c-114d, 114e-114f in response to processing and communicating the workflow data 112a-112f. The real-time data 114a-114b, 114c-114d, 114e-114f may indicate a start of network communications and an end of network communications. This type of communication process is referred to as a handshake messaging, or signaling, process. TCP is an example of a protocol that uses this type of handshake messaging process. In this example, the real-time data 114a-114f may comprise a data sequencing initiation message and a data completion acknowledgement message. The data sequencing initiation message and a data completion acknowledgement message can be used to measure a Round Trip Time (RTT) value. In some embodiments, the RTT values may be a system variable available for inspection. The RTT variable value can be used to determine an amount of time to process and communicate workflow data 112a-112f for an application 102a-102i in an application workflow 104a-104c. Delta $T_1$ and delta $T_2$, in FIG. 1, for workflow data 112a-112f, respectively, are examples of real-time data and are the measured processing and communication times (application execution times) of first application 102a and second application 102b to process and communicate the workflow data 112a-112f. Although TCP is specifically described herein, other protocols used in the communication process may also have RTT variables available on a system that are suitable for the intended purpose described above.

The applications 102a-102i of the application workflows 104a-104c have associated therewith static variables 124a-124i. The static variables 124a-124i are stored in memory 118, and are set based on a specification for the applications 102a-102i in the workflows 104a-104c and the service level agreements associated with the applications 102a-102i. In one embodiment, static variables 124a-124i include predefined processing time frame data, time threshold data, and service level requirements and terms associated therewith. The processing time frame data are acceptable amounts of time, based on service level agreements, for applications 102a-102i in the application workflows 104a-104c to process and communicate workflow data 112a-112f. The time threshold data are acceptable amounts of time, based on service level agreements, for applications and dependent applications in the application workflows 104a-104c to process and communicate workflow data 112a-112f.

The instruction set 122 can be in distributed form wherein the instruction set 122 is integrated with various applications within the application service architecture 100; in a centralized form wherein the application workflows 104a-104c of the plurality of applications 102 and the networked computing devices of the network 106 feed real-time data 114a-114f to a centralized processing system; or a combination thereof. The various applications 102 can include an application 102 that is part of an application workflow 104a-104c, an application 102 that manages communications in a protocol stack, such as TCP, and an application 102 used to manage process logs for a particular networked computing device or a cluster of networked computing devices.

The memory 118 can be cache memory and swap memory used to temporarily store the instruction set 122, static variables 124, real-time data 114a-114f, algorithmic predictive analysis models, and any other data used in the execution of an application function. In practice, the instruction set 122 is executed by the processor 116 to monitor application workflows 104a-104c, receive real-time data 114a-114f during operation of application workflows 104a-104c, determine service impacts 126 using the real-time data 114a-114f and static variables 124, and, in real-time, generate reports when conditions indicate a disruption in an application function, application service, or both.

The network infrastructure arrangement of instruction set 122 and the type of memory 118 used are arranged to minimize delays in determining and predicting service impacts. In Big Data type applications, executing the instruction set 122 or component parts thereof in cache memory may be required in order to minimize computational delays that could result in loss and/or misuse of the application service architecture 100.

In a practical application, the first application workflow 104a of application service architecture 100 can be used to render batch processing jobs (application service) with the first application 102a dedicated to performing a first type of application function, the second application 102b dedicated to performing a second type of application function, and the third application 102c dedicated to performing a third type of application function. Each application 102a, 102b, and 102c is bound by a service level agreement. As an example, the agreement associated with the application service may require the first application 102a to perform the first type of application function on predetermined amounts of data at specified times each day within a processing time frame for the first application 102a; the second application 102b to perform the second type of application function on the output from the first application 102a within a processing time threshold for second application 102b; and the third application 102c to perform the third type of application function on the output from the second application 102b within a processing time threshold of the third application 102c. The processing time threshold of the second application 102b is the sum of the processing time of the first application 102a plus an application execution time for the application function of the second application 102b. The processing time threshold of the third application 102c is the sum of the processing time of the first application 102a, the processing time of second application 102b, and the processing time of the third application 102c.

The processor 116 can receive real-time data 114a generated by the first application 102a and the second application 102b in the application workflow 104a and determine a time delay (delta $T_1$ from FIG. 1) associated with the real-time data 114a. The time delay (delta $T_1$) is the delay introduced into the application service as a result of executing the first application 102a. The processor 116 can then compare the time delay (delta $T_1$) for the first application 102a with static variables 124 for the first application 102a. The processor 116 can then determine a first service impact 128a for the first application 102a if the results of the comparison exceeds the processing time frame for the first application 102a. The processor 116 can then use an algorithmic model, e.g. an a-priori knowledge base, an AI based algorithmic model, an ML based algorithmic model, or any combination thereof, to predict a second service impact 128b for the second application 102b. For the second application 102b, the processor 116 uses the first service impact 128a for the first application 102a and the time threshold for the second application 102b as determined from the static variables 124 to determine a probability of whether service of the second application 120 is likely to be impacted. For example, if the second application 102b is expected to receive workflow data 112a from first application 102a by 8:00 am on a particular day, but the real-time data 114a indicates that first application 102a is experiencing processing delays such that workflow data 112a won't be available until 10:00 am on that particular day, then processor 116 can predict second service impact 128b. The processor 116 can then generate a first service impact report 126a according to the determined first service impact 128a and the predicted second service impact 128b and send the service impact report 126a to a recipient at the user computing device 110.

In certain embodiments, the service impact report 126a may then be used to remedy the issue in a timely manner so that network, processing, and memory resources can be used in a more efficient and timely manner. For example, processing and memory resources being reserved for second application 102b may be redirected to perform other tasks during the time of the delay in receiving workflow data 112a from first application 102a. In addition, processor 116 may identify other sources of workflow data 112a (e.g., applications 102 other than first application 102a) and route the workflow data 112a from that alternative source application 102 on a more timely basis so that processing and memory resources used for second application 102b are not wasted.

In addition, the processor 116 can receive real-time data 114b generated by the second application 102a and the third application 102c in the application workflow 104a and determine a time delay (delta $T_2$ from FIG. 1). As previously mentioned, the time delay can be determined based on an RTT value. The static variables 124 comprise the processing time threshold for the second application 102b and the processing time threshold for the third application 102c. The processor 116 can compare the time delay (delta $T_2$) with the processing time threshold of the second application 102b. If the time delay exceeds the processing time threshold, the processor 116 can generate a third service impact 128c for the second application 102b based on the comparison. The processor 116 can then use an algorithmic model, e.g. an a-priori knowledge base, an AI based algorithmic model, an ML based algorithmic model, or any combination thereof, to predict a fourth service impact 128d for the third application 102c. For the third application 102c, the processor 116 uses the third service impact 128c for the second application 102b, and the processing time threshold associated with the third application 102c as determined from the static variables 124 to determine a probability of whether service of the third application 102c is likely to be impacted. The processor 116 can then generate a second service impact report 126b according to the determined third service impact 128c and the predicted fourth service impact 128d, and send the second service impact report 126b to a recipient at the user computing device 110 or other tools used in performing maintenance on the system.

In certain embodiments, the service impact report 126b may then be used to remedy the issue in a timely manner so that network, processing, and memory resources can be used in a more efficient and timely manner. For example, processing and memory resources being reserved for third application 102c may be redirected to perform other tasks during the time of the delay in receiving workflow data 112b from second application 102b. In addition, processor 116 may identify other sources of workflow data 112b (e.g., applications 102 other than second application 102b) and route the workflow data 112b from that alternative source application 102 on a more timely basis so that processing and memory resources used for third application 102c are not wasted.

A service impact to one of the applications 102a-102i can be a delay significant enough to indicate the impacted application is not performing at expected levels and either the impacted application is functioning poorly, supporting applications and networking services are functioning poorly, dependent applications are functioning poorly, applications the impacted applications are dependent on are functioning poorly, or a combination thereof. As an example, if a communication protocol stack in the network 106 is saturated (data overflow) because of defective hardware or network congestion one or more of the applications 102a-102i may experience delay that can impact performance or result in loss of network resources. Poorly functioning applications and services can lead to a default in service agreements, a delay in system throughput for an application service, and a complete shutdown of an application service.

Example Method for Network Integrated Diagnostic System and Predictive Analysis Tool FIG. 2 illustrates an example flowchart of a method 200 for implementing the network integrated diagnostic system and predictive analysis tool 105. Modifications, additions, or omissions may be made to method 200. Method 200 may include more, fewer, or other operations. For example, operations may be performed in parallel or in any suitable order. While at times discussed as the application service architecture 100, plurality of networked connected applications 102, the network integrated diagnostic system and predictive analysis tool 105, network 106, processor 116, or components of any of thereof performing operations, any suitable system or components of the system may perform one or more operations of the method 200. For example, one or more operations of method 200 may be implemented, at least in part, in the form of software instruction set 122 of FIG. 1, stored on non-transitory, tangible, machine-readable media (e.g., memory 118 of FIG. 1) that when run by one or more processors (e.g., processor 116 of FIG. 1) may cause the one or more processors to perform operations 200-230.

Method 200 begins at operation 202 where memory 118 stores static variables 124 for the plurality of applications 102. Among other things, the static variables 124 comprise one or more processing time frames for each application in the plurality of applications 102. The static variables 124 also comprise at least one time threshold value for each application in the plurality of applications 102.

At operation 204, processor 116 receives real-time data 114a for the first application 102a that is generated during processing and communication (execution of the application) of the first application 102a. In some embodiments, the real-time data 114a may be an RTT value that indicates a time delay value associated with executing the first application 102a. Alternatively, the real-time data 114a may be a data initiation and communication process completed message generated by the first application 102a and the second application 102b that can be used by the processor 116 to determine the time delay (RTT Value).

At operation 206, the processor 116 compares the time delay (delta $T_1$) associated with the real-time data 114a with the processing time frame of the static variable 124a, from the static variables 124, for the first application 102a. At operation 208, the processor 116 determines the first service impact 128a for the first application 102a based on the results of the comparison in operation 206. The first service impact 128a is realized if the time delay exceeds the processing time frame for the first application 102a. In one embodiment, the processing time frame can be a dynamic value adjustable in real-time based on dependent application functions, system load, or both.

At operation 210, the processor 116 predicts the probability of the second service impact 128b for the second application 102b by using an algorithmic model (artificial intelligence or machine learning based algorithmic model), a-priori knowledge base, or both and the first service impact 128a for the first application 102a and a time threshold, as determined from the static variable 124b associated with the second application 102b. The difference in the time delay (delta $T_1$) and the processing time frame associated with the first service impact 128a of the first application 102a, the time threshold of the second application 102b, and the algorithmic model, a-priori knowledge base, or any number and combination of these can be used in determining the probability. A probability value above a preset value can be used to indicate a service impact. At operation 212, processor 116 can generate a first service impact report 126a based on the determined first service impact 128a and the predicted second service impact 128b and send the report 126a to the user computing device 110. In some embodiments, the probability value indicating an impact of service to the second application 102b can be a dynamic value adjustable in real-time based on dependent application functions, system load, or any number and combination of these. At operation 214, the processor 116 determines if there are more application to manage. If the processor 116 determines there are no more application to manage, the execution ends at operation 230. If the processor 116 determines there are additional applications 102 to manage at operation 214, execution proceeds to operation 216.

At operation 216, processor 116 receives real-time data 114b for the second application 102b that is generated during processing and communication (execution of the application) of the second application 102b. At operation 218, processor 116 compares the time delay (delta $T_2$) associated with the real-time data 114b with the processing time frame of a static variable 124b for the second application 102b. At operation 220, processor 116 determines a third service impact 128c for the second application 102b based on the results of the comparison. A third service impact 128c is realized if the time delay (delta $T_2$) exceeds the processing time frame for the second application 102b. At operation 222, processor 116 predicts the probability of a fourth service impact 128d for the third application 102c by using the algorithmic model, a-priori knowledge base, or any number and combination of these and the third service impact 128c and a time threshold associated with the third application 102c. The difference in the time delay (delta $T_2$) and the processing time frame associated with the third service impact 128c for the second application 102b, the time threshold associated with the third application 102c, and the algorithmic model, a-priori knowledge base, or any number and combination of these can be used in determining the probability. At operation 224, the processor 116 generates a second service impact report 126b based on the determined third service impact 128c and the predicted fourth service impact 128d and sends the second service impact report 126b to the user computing device 110. At operation 226, processor 116 determines if there are more applications 102 to manage. If the processor 116 determines there are no more applications to manage, execution ends at operation 230. If the processor 116 determines there are more applications 102 to manage, the method 200 continues to operation 228 where the processor 116 performs operations similar to operations 218 through 226 for additional applications 102 to be managed. The processor 116 can continuously monitor workflows 104a-104c and perform operations similar to those described above for applications 102 of other workflows 104. Execution concludes at operation 230. The description above in relation to operations 216-228 are an abbreviated version of operations 202-212 but it should be understood that any functionality described in relation to operations 202-212 are also applicable in relation to operations 216-228 and so forth.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:
1. A system, comprising:
    a memory storing static variables for a plurality of applications, the static variables comprising a processing time frame required to satisfy a service level require- ment for a first application and a time threshold required to satisfy a service level requirement for a second application;
a processor communicatively coupled to the memory and configured to:
receive real-time data for the first application, wherein the first application is associated with the second application in a workflow, the real-time data for the first application comprises a time delay associated with executing the first application;
compare the real-time data for the first application with the static variables for the first application;
determine a first service impact for the first application based on the comparison of the real-time data for the first application with the static variables for the first application;
predict a second service impact for the second application based on the first service impact for the first application and the time threshold associated with the second application;
generate a service impact report according to the determined first service impact and the predicted second service impact;
send the service impact report to at least one recipient computing device;
receive real-time data for the second application, wherein the second application is associated with a third application in the workflow:
wherein the static variables further comprise a second processing time frame required to satisfy the service level requirement for the second application and a second time threshold required to satisfy a service level requirement for the third application;
compare the real-time data of the second application with the static variables of the second application;
determine a third service impact for the second application based on the comparison of the real-time data for the second application with the static variables for the second application;
predict a fourth service impact for the third application based on the third service impact for the second application and the second time threshold associated with the third application;
generate a second service impact report according to the determined third service impact and the predicted fourth service impact; and
send the second service impact report to the at least one recipient computing device.

2. The system of claim 1, wherein the plurality of applications are network connected and configured to perform a time sensitive network service using at least one hand-shake signal between the first application and at least one other application from the plurality of applications.

3. The system of claim 2, wherein the processor is further configured to determine the time delay associated with executing the first application based at least in part upon the at least one hand-shake signal.

4. The system of claim 3, wherein the processor is further configured to compare the time delay associated with executing the first application against a threshold value associated with the first application to determine the first service impact.

5. The system of claim 1, wherein the processor is further configured to predict a service impact using a knowledge base and an algorithmic model.

6. The system of claim 1, wherein the processor is further configured to determine an effect of a service impact based on the static variables.

7. A method, comprising:
storing static variables for a plurality of applications, the static variables comprising a processing time frame required to satisfy a service level requirement for a first application and a time threshold required to satisfy a service level requirement for a second application;
receiving real-time data for a first application, wherein the first application is associated with the second application in a workflow, the real-time data for the first application comprises a time delay associated with executing the first application;
comparing the real-time data for the first application with the static variables for the first application;
determining a first service impact for the first application based on the comparison of the real-time data for the first application with the static variables for the first application;
predicting a second service impact for the second application based on the first service impact for the first application and the time threshold associated with the second application;
generating a service impact report according to the determined first service impact and the predicted second service impact;
sending the service impact report to at least one recipient computing device;
receiving real-time data for the second application, wherein the second application is associated with a third application in the workflow;
wherein the static variables further comprise a second processing time frame required to satisfy the service level requirement for the second application and a second time threshold required to satisfy a service level requirement for the third application;
comparing the real-time data of the second application with the static variables of the second application;
determining a third service impact for the second application based on the comparison of the real-time data for the second application with the static variables for the second application;
predicting a fourth service impact for the third application based on the third service impact for the second application and the second time threshold associated with the third application;
generating a second service impact report according to the determined third service impact and the predicted fourth service impact; and
sending the second service impact report to the at least one recipient computing device.

8. The method of claim 7, wherein the plurality of applications are network connected and configured to perform a time sensitive network service using at least one hand-shake signal between the first application and at least one other application from the plurality of applications.

9. The method of claim 8, further comprising determining the time delay associated with executing the first application based at least in part upon the at least one hand-shake signal.

10. The method of claim 9, further comprising comparing the time delay associated with executing the first application against a threshold value associated with the first application to determine the first service impact.

11. The method of claim 7, further comprising predicting a service impact using a knowledge base and an algorithmic model.

12. The method of claim 7, further comprising determining an effect of a service impact based on the static variables.

13. A non-transitory computer-readable storage medium storing instructions that when executed by a processor, cause the processor to:
- store static variables for a plurality of applications, the static variables comprising a processing time frame required to satisfy a service level requirement for a first application and a time threshold required to satisfy a service level requirement for a second application;
- receive real-time data for a first application, wherein the first application is associated with the second application in a workflow, the real-time data for the first application comprises a time delay associated with executing the first application;
- compare the real-time data for the first application with the static variables for the first application;
- determine a first service impact for the first application based on the comparison of the real-time data for the first application with the static variables for the first application;
- predict a second service impact for the second application based on the first service impact for the first application and the time threshold associated with the second application;
- generate a service impact report according to the determined first service impact and the predicted second service impact;
- send the service impact report to at least one recipient computing device;
- receive real-time data for the second application, wherein the second application is associated with a third application in the workflow;
- wherein the static variables further comprise a second processing time frame required to satisfy the service level requirement for the second application and a second time threshold required to satisfy a service level requirement for the third application;
- compare the real-time data of the second application with the static variables of the second application;
- determine a third service impact for the second application based on the comparison of the real-time data for the second application with the static variables for the second application;
- predict a fourth service impact for the third application based on the third service impact for the second application and the second time threshold associated with the third application;
- generate a second service impact report according to the determined third service impact and the predicted fourth service impact; and
- send the second service impact report to the at least one recipient computing device.

14. The non-transitory computer-readable storage medium of claim 13, wherein the plurality of applications are network connected and configured to perform a time sensitive network service using at least one hand-shake signal between the first application and at least one other application from the plurality of applications.

15. The non-transitory computer-readable storage medium of claim 14, wherein the instructions further cause the processor to determine the time delay associated with executing the first application based at least in part upon the at least one hand-shake signal.

16. The non-transitory computer-readable storage medium of claim 14, wherein the instructions further cause the processor to compare the time delay associated with executing the first application against a threshold value associated with the first application to determine the first service impact.

17. The non-transitory computer-readable storage medium of claim 13, wherein the instructions further cause the processor to predict a service impact using a knowledge base and an algorithmic model.

* * * * *